United States Patent [19]

Charlebois

[11] 4,322,573

[45] Mar. 30, 1982

[54] ENCAPSULATION OF TELECOMMUNICATIONS CABLE SPLICES

[75] Inventor: Leonard J. Charlebois, Kanata, Canada

[73] Assignee: Northern Telecom Limited, Montreal, Canada

[21] Appl. No.: 129,246

[22] Filed: Mar. 11, 1980

[51] Int. Cl.³ .............................................. H01R 3/02
[52] U.S. Cl. ................................. 174/72 R; 156/49; 174/88 P
[58] Field of Search ............... 174/84 R, 88 R, 71 R, 174/72 R; 156/49

[56] References Cited

U.S. PATENT DOCUMENTS 4,107,451  8/1978  Smith et al. ......................... 156/49 X
4,152,539  5/1979  Charlebois et al. .......... 174/88 R X Primary Examiner—B. A. Reynolds
Assistant Examiner—D. A. Tone
Attorney, Agent, or Firm—R. J. Austin

[57] ABSTRACT

A cable splice formed by wrapping an electrical connection in sealing tape and injection molding an encapsulation on the connection. The sealing tape is formed of material (e.g. ethylene propylene rubber) which softens under the influence of the injection molding temperature, and is shaped intimately into fluid-tight sealing contact with the electrical connection by shrinkage of the encapsulation during cooling. The material of the sealing tape is also heat insulating to resist increase in temperature of the insulated conductors within the cable during the injection molding process.

8 Claims, 4 Drawing Figures

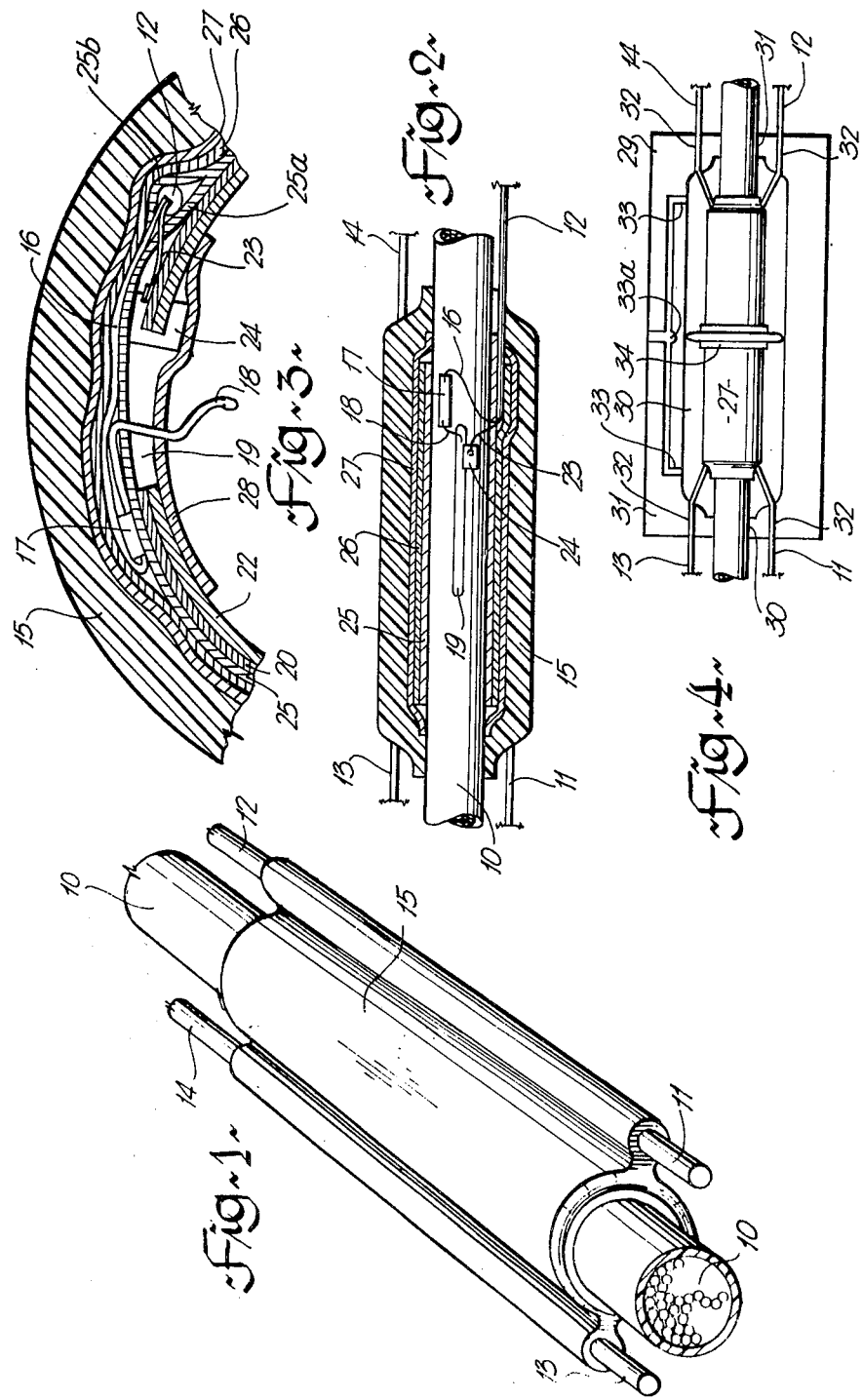

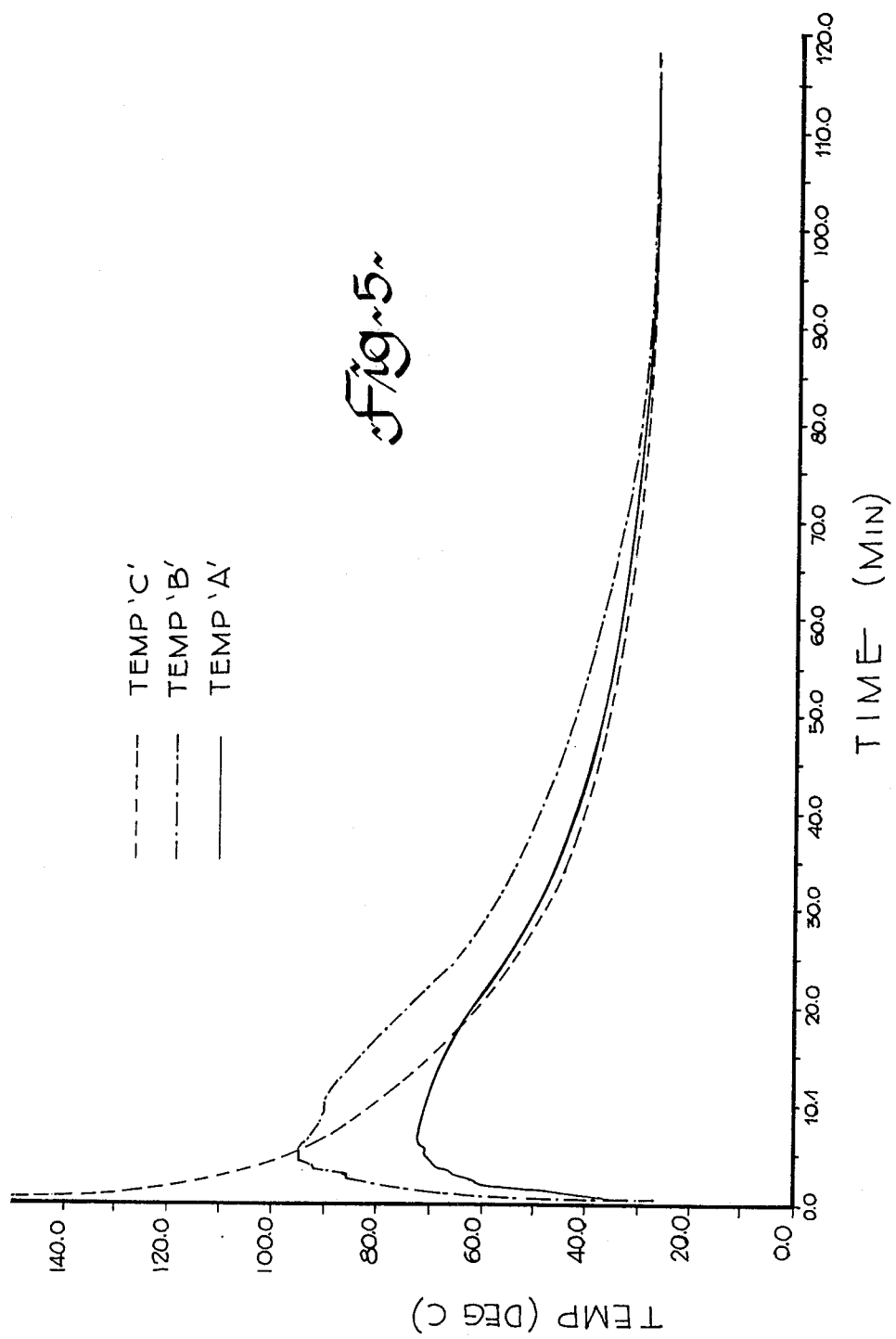

ENCAPSULATION OF TELECOMMUNICATIONS CABLE SPLICES

This invention relates to telecommunications cables and is essentially concerned with encapsulation of splices formed between wires of a cable and a branch cable.

A telephone distribution system from a central office to subscribers has the general form of a tree network in that there is a main telecommunications cable which divides into a plurality of main branch cables which further subdivide into branches and thence into sub-branches. This process may continue for many further sub-divisions. The main cable is a number of multi-thousand pair of cables that run out of the central office. The cables branch off numerous times before the final branch cable, i.e. the customer drip wire, branches off. Each of the branching points or nodes necessitates splicing one cable to another, a pair at a time.

In one current method of splicing cables, the cables are opened and when the wires are spliced in place they are wrapped with many layers of sealing tape and closed in with a preformed heat shrinkable split sleeve. An external heat source has to be applied to the sleeve to raise the temperature within the sleeve to melt the tapes with the intention of shrinking them onto the spliced joint and exiting wires. There are at least two disadvantages in this process. Firstly, because of the sleeve thickness, it takes an unacceptable amount of time to melt the tapes; in some cases this is at least 7 or 8 minutes during heating and 30–50 minutes for cooling. Secondly, the tapes only shrink down sufficiently to shape themselves to the splice and cable ends at the splice. In many cases an open flame from a torch is used to provide the required heat making the system highly craft sensitive.

In another method, a cable opening is taped and a split sleeve is placed around the cable. The sleeve ends are sealed with layers of sealing tape. The sleeve is then flooded with a pouring type encapsulating sealant, such as polyurethane.

The present invention provides a telecommunications cable having a splice which is reliably watertight. The invention also provides a method of making such a cable splice while using high temperatures during encapsulation and in which no damage is caused to insulated conductors because of high temperatures.

Accordingly, the present invention provides a method of forming a splice in a telecommunications cable between a pair of bared conductor ends of a first cable and a pair of bared conductor ends of a second cable comprising:

forming electrical connections between conductor ends of one pair and conductor ends of the other pair;

wrapping the connection and adjacent cable parts in sealing tape so as completely to enclose the connections and bared conductor ends;

injection molding an encapsulation of molten plastic material around the sealing tape wrapping and around adjacent insulation covered cable, the injection temperature being sufficiently high to soften the sealing tape and to soften said adjacent insulation, and the plastic material being compatible with the material of the insulation to provide a fluid tight bond upon cooling; and cooling the encapsulation during which it shrinks upon the softened sealing tape, the resultant pressure causing the tape to become shaped intimately into fluid-tight sealing contact with the connection and bared conductor ends.

In a practical method, the bared conductor ends are connected outside the confines of the first cable and the sealing tape is wrapped around the first cable and between the first cable and the connection to cover and seal an opening in the cable from which its pair of conductors extend. The tape is then wrapped over the connection to cover the bared conductor ends completely and hold them against the tape already applied to the first cable with the other pair of conductors forming at least part of a branch cable. The encapsulation is then applied around the sealing tape and adjacent insulation is covered on the first cable. The encapsulation also encloses insulation covered regions of the other pair of conductors adjacent the connected conductors.

In the above method, the tape should have heat insulating properties to limit heat transfer from the injection moulded plastics to prevent softening and flow of the insulation covering conductors in cable and beneath the tape. Such softening and flow could otherwise cause undesirable movement of insulated conductors towards each other such as to adversely affect the electrical properties of the cable. One sealing tape found particularly useful in this respect is made from an ethylene-propylene rubber.

The invention is of particular interest when the insulation of the cable is polyethylene. Plastics materials compatible with this and useful for the injection moulded encapsulation include ethylene acrylic acid, ionized metacrylic acid and polyethylene.

In the inventive process, it is preferable to use a metal mould for the encapsulation and ideally this should be water cooled and/or be a highly heat conductive aluminum. When the encapsulation is injection moulded, heat transfer from the hot plastics into the mould forms a cooled skin on the encapsulation to prevent the inclusion and entrapment of air beneath the skin upon cooling and shrinking of the remainder of the encapsulation.

The invention also includes a telecommunications cable having a splice comprising:

electrical connections between a pair of bared conductor ends of a first cable and a pair of bared conductor ends of a second cable;

a layer of sealing material sealing by enclosing and in intimate contact with the connections, bared conductor ends, and adjacent insulation on cable parts, the layer formed from wrappings of sealing tape heat softened and shaped into said intimate contact; and an injection moulded encapsulation of plastics material completely surrounding the wrapping and adjacent insulation covered cable, the encapsulation being sealingly bonded to said adjacent insulation.

In preferred constructions in which outer covering insulation on the cable is polyethylene, the encapsulation is an injection moulded ethylene acrylic acid, ionized resins, a polyethylene, or ethylene vinyl acetate. Examples of these materials which are found to be compatible with polyethylene insulation are ethylene acrylic acid sold by Dow Chemical of Canada Limited under their product numbers 459, 455 and 435, ionized resins sold by DuPont under their trade names 'Surlyn 1652' and 'Surlyn 1702', and ethylene vinyl acetate sold by DuPont of Canada Limited under their product number 3180.

The bond between ethylene acrylic acid and polyethylene depends upon the amount of acrylic acid in the encapsulation material. Grade numbers 459 and 455 have an acrylic acid content of around 8% by weight of the ethylene acrylic acid and achieves a better bond than grade 435 which has an acrylic acid content of about 3.5%.

Also, in preferred constructions, the layer of sealing material is surrounded by a layer of material which remains unsoftened at the heat softening temperature of the sealing material, or, effectively, in the performance of the process, at the injection moulding temperature.

Embodiments of the invention will now be described, by way of example, with reference to the accompanying drawings in which:

FIG. 1 is an isometric view of a splice of four drop wires from a main telecommunications cable;

FIG. 2 is a cross-sectional view along the axis of the splice in FIG. 1;

FIG. 3 is a cross-sectional view across the axis of the splice and on a larger scale than in FIG. 1;

FIG. 4 is a view similar to FIG. 2 showing one stage in the manufacture of the splice and with the region of the splice mounted within an injection mould; and FIG. 5 is a graph to show heat dissipation in the splice after formation.

As shown in FIG. 1, a main telecommunications cable 10 has four drop wire pairs 11, 12, 13, 14 spliced to pairs of conductors of the main cable. For convenience in splicing, the drop wire emerges from an encapsulation 15, two axially at each end of the encapsulation with wires at each end diametrically offset from one another across the main cable.

Each drop wire is electrically connected to its associated pair of main cable conductors in a manner similar to the other drop wires. Thus, for convenience, one such connection only is described. As shown in FIGS. 2 and 3, the drop wire 12 has its pair 16 of conductors connected to a conventional splice connector 17. A selected pair 18 of wires from the main cable 10 are also connected to connector 17 after emerging from a longitudinal slit 19 in the polyethylene outer sheath 10 and metallic sheath 22 of cable 10. A ground wire 23 from drop wire 12 is grounded to the metallic sheath of the cable 10 by a ground clamp 24 which is attached to the sheath at one side of the slit 19.

A layer of sealing material sealingly encloses the ground clamp 24, the connector 17 and the ground wire 23 and bared ends of conductor pairs 16, 18. The sealing material also encloses the slit 19 and the insulation of the conductor pairs 16, 18 adjacent the bared conductor ends. As shown in FIG. 3, the layer of sealing material comprises overlapped wrappings 25 of ethylene-propylene rubber sealing tape which extend completely around the main cable 1 along the axial region of the slit 19 so as to cover the ground clamp 24, and the ground wire 23. It also passes both under and over the insulated ends of the drop wire 12 as shown at 25a and 25b, the drop wire being retained against the side of the main cable. The layer of sealing material also comprises further overlapped wrappings 26 of ethylene-propylene rubber sealing tape which lie over wrappings 25 and also cover the pair of wires 18 and 16 and the connector 17 to completely enclose the connector 17 and the bared ends of the conductors of wire pairs 18 and 16. Although for convenience, the wrappings 25, 26 are shown as separate in FIG. 3, it is to be understood that in the finished splice, the wrappings are merged together to form the layer of sealing material.

Around the layer of sealing material is disposed a layer 27 of material which remains unsoftened at the heat softening temperature of the sealing material. The layer 27 is formed from overlapped wrappings of glass tape which completely surround the sealing material and extend axially beyond its ends onto the outer sheath 20 of the main cable as shown by FIGS. 2 and 4.

The splice is completed by the encapsulation 15 completely covering the sealing and glass tape layers.

In the manufacture of the slice, after the slit 19 is formed for the desired length along cable 10, the pair 18 of wires are drawn through the slit and through a hole made in a protective tongue 28 which is then inserted through the slit to extend beneath the metallic sheath 22 as shown in FIG. 3. The tongue 28 is made from polyethylene and serves to retain any filling material such as grease within cable 10 during the encapsulation operation. The ground clamp is then secured to the sheath 22 at one side of the slit and the ground wire 23 is electrically connected to it.

The wrappings 25 of sealing tape are then made while ensuring the pairs 16 and 18 of wire extend through the wrappings. The pairs then have insulation removed at their ends and the bared conductor ends are joined to connector 17. The connector and the wires 16, 18 with their bared ends are then covered by the wrappings 26 of sealing tape.

It is to be understood that the other three drop wires are connected in a similar manner to ground clamps and their selected wires of the cable 10.

After the layer of glass tape 27 has been added, the partly completed splice is then located within an aluminum injection mould. In FIG. 4, one mould half 29 is shown with the cable 10 extending through it. Each mould half as in mould half 29 comprises a semi-cylindrical mould cavity 30 opening onto a planar mould surface 31 for contacting the other mould half. The surface 31 is also formed with aligned semi-cylindrical openings 30, 31 for the main cable 10, four openings 32 for passage of drop wires, and gate passages 33 opening into the cavity 30 centrally and adjacent each end of the mould cavity. A centrally disposed blind passage 33a is provided for accommodating the leading plastics portion from the injection moulding machine so as to hold it away from the main flow passages in case it has not been softened sufficiently for injection purposes. Also provided in surface 33 are passages for plastic spew from the injection moulding process. The mould is provided with water cooling passages (not shown).

With the mould closed and substantially sealed upon the cable 10 and drop wires 11, 12, 13, 14 and with water coolant passing through the passages provided to provide a mould temperature 38° C., the part of the cable with the partly completed splice is disposed within the mould cavity as shown in FIG. 4. To center the main cable within the cavity which is 12 inches long or possibly longer, a spacing member 34 is disposed around the cable, substantially midway along the cavity. The use of the spacing member 34 is the subject of a U.S. patent application Ser. No. 129,245 filed Mar. 12, 1980 entitled "Splicing of Electrically Insulated Cable", and in the name of Leonard Joseph Charlebois. As described in said other application, the material of the spacing ring 34 is compatible with the plastic material to be injected into the mould cavity. In this instance, the member is made from polyethylene.

The plastics material injected into the mould cavity in this instance is ethylene acrylic acid sold by Dow Chemical of Canada Limited under product number 459. This material has an acrylic acid content of approximately 8% by weight of the total weight of the material. The temperature of the molten plastic within the extruder is 185° C. During formation of the encapsulation 15, the polyethylene of the member 34 and the outer sheath of the cable 10 the pairs 16, 18 and the drop wires is softened by the molten ethylene acrylic acid to enable the two materials to form a good mechanical bond together. Also, the ethylene-propylene rubber tape of the wrappings 25 and 26 are softened so as to form the sealing layer, the layer 27 preventing migration of the ethylene propylene rubber into the encapsulation material.

The aluminum mould is sufficiently heat conductive, especially when water cooled as in this embodiment, to cool the surface of the moulded encapsulation rapidly and form a skin. As the encapsulation cools and shrinks, the skin then forms a barrier to prevent air from entering the encapsulation and forming air bubbles or pockets. The mould temperature is reduced to 27° C. during cooling of encapsulant.

During cooling, the shrinkage of the encapsulation compresses the sealing tape and causes it to become shaped intimately and fluid-tightly in sealing contact with the connection 17 and bared wire conductors of wire pairs 16, 18. Fluid tight sealing engagement is also provided between the sealing layer and the ground clamps and earth wires and around the outer sheath of cable 10 and the insulated regions of wire pairs 16, 18.

Although the injection temperature is 185° C., this temperature does not actually reach any of the insulated wires or connected ends in the splice to cause damage. The ethylene-propylene rubber of the sealing tape is sufficiently non-heat conductive to prevent this from happening. Also, the polyethylene tongue 28 within the slit 29 is a further protection against heat transfer to the wires within cable 10.

In an experiment performed to discover the temperatures reached at various parts of a splice made in the above way by the use of thermocouples inserted into the splice, the following maximum temperatures were recorded for an injection temperature in the extruder of 185° C. At each end of slit 19, beneath the sealing layer and on the cable core temperature 'A' has a maximum of 72° C. In the region of connector 17, i.e. between wrappings 25 and 26—temperature 'B' has a maximum of 95° C. At each end of the encapsulation, i.e. between the encapsulation 15 and the outer sheath 20—temperature 'C' has a maximum of 150° C. This latter temperature was reduced to below 100° C. after 5 minutes by the water cooled mould.

FIG. 5 shows in graph form the above temperatures A, B, and C from the injection stage and during cooling to show the rate of heat dissipation from the splice.

In further tests performed upon the completed splice, no deterioration of the electrical properties of the cables and wires were shown to take place, thus indicating the injection moulding temperatures had had little or no effect upon either conductors or insulation and apparently had caused no movement in the grease because of softening within cable 10. Further, static load and impact tests which were performed showed no electrical or mechanical damage. In addition, temperature cycle tests and moisture ingress tests performed upon the splice gave satisfactory electrical resistance results. These tests involved the immersion of the splice in water with the cable 10 ends open at each side of the splice and with the temperature cycled between −40° C. and +60° C.

In another embodiment with the same construction and method of forming a splice, the ethylene acrylic acid was replaced by an ionized resin sold under the trade name 'Surlyn 1702' by DuPont, similar results were obtained.

What is claimed is:

1. A method of forming a splice in a telecommunications cable between a pair of bared conductor ends from a first cable and a pair of bared conductor ends of a second cable comprising:
   drawing a selected pair of conductors from the first cable through a slit in the cable, providing said conductors with bared ends, and forming electrical connections between said bared ends of the first cable and the bared ends of the second cable;
   wrapping overlapping and contacting windings of heat softenable sealing tape around the first cable and beneath the connections and the bared conductor ends;
   wrapping overlapping and contacting windings of the sealing tape in contact with the first windings and around said first cable and over the connections and bared conductor ends so as completely to enclose the connections and bared conductor ends in the overlapped windings;
   injection molding an encapsulation of molten plastic material around the sealing tape wrapping and around adjacent insulation covered cable, the injection temperature being sufficiently high to soften the sealing tape and merge it into a single mass to cause the mass to completely and sealingly enclose the bared conductor ends and connections, the plastic material being compatible with the material of the insulation to provide a fluid-tight bond upon cooling; and
   cooling the encapsulation during which it shrinks upon the softened sealing tape the resultant pressure causing the merged single mass of tape to become shaped intimately into fluid-tight sealing contact with the connection and bared conductor ends.

2. A method according to claim 1 further comprising surrounding the sealing tape by a material which is unsoftened at the injection moulding temperature.

3. A method according to claims 1 or 2 further comprising wrapping the windings of sealing tape in the form of ethylene-propylene rubber.

4. A telecommunications cable having a splice comprising:
   electrical connections between a pair of bared conductor ends of a first cable and a pair of conductor ends of a second cable;
   a layer of sealing material sealingly enclosing and in intimate contact with the connections, bared conductor ends, and adjacent insulation on cable parts, the layer formed from overlapped windings of heat softenable sealing tape around the first cable, beneath and then over the bared conductor ends, the tape heat softened and shaped into said intimate contact; and
   an injection moulded encapsulation of plastics material completely surrounding the wrapping and adjacent insulation covered cable, the encapsulation being sealingly bonded to the said adjacent insulation.

5. A cable according to claim 4 wherein:
one of the pairs of conductors extend through a slit in the first cable;
the sealing material extends around the first cable to cover the slit and beneath the electrical connections, the sealing material also extending over the electrical connections and over the adjacent insulated end of the second cable to hold it within the sealing material.

6. A cable according to claims 4 or 5 wherein the layer of sealing material which remains unsoftened at the injection moulding temperature of the sealing material, completely surrounds the sealing material.

7. A cable according to claims 4 or 5 wherein the layer of sealing material is formed from sealing tape of ethylene propylene rubber.

8. A cable according to claims 4 or 5 wherein the first cable has an outer sheath which comprises polyethylene and the encapsulation is made from a material selected from the group consisting of ethylene acrylic acid, ionized resin, polyethylene and ethylene vinyl acetate.

* * * * *